3,651,154
PROCESS FOR PREPARING POLYHALO-
NAPHTHOLS
Erwin Klingsberg, Geneva, Switzerland, assignor to
American Cyanamid Company, Stamford, Conn.
No Drawing. Filed Jan. 29, 1968, Ser. No. 701,115
Int. Cl. C07c 39/38
U.S. Cl. 260—623 R     1 Claim

ABSTRACT OF THE DISCLOSURE

A process for hydrolyzing polyhalonaphthalenes, such as octachloronaphthalene, by reacting the polyhalonaphthalene with an alkali metal hydroxide in a polar high boiling solvent miscible with water and inert to the hydroxide. Typical solvents are dimethyl sulfoxide, dimethyl sulfone, hexamethylphosphoric triamide, and N-methyl-2-pyrrolidone. A typical product is heptachloro-1-naphthol which is useful as a fungicide, algaecide and bactericide.

This invention relates to a process for hydrolyzing polyhalonaphthalenes and to the resulting naphthols.

It is known that halogenated naphthalenes such as tri-, tetra-, penta-, or octachloronaphthalenes, including mixtures thereof, are exceedingly difficult to hydrolyze to their corresponding naphthalenes. These naphthalenes are known to be resistant to most acids and alkalis even up to their boiling ranges.

In accordance with the present invention, it has been found that the solvent medium in the hydrolysis with an alkali hydroxide is critical for facile hydrolysis of polyhalonaphthalenes. It has now been discovered that use of highly polar, high boiling solvents, which are inert to the alkali metal hydroxide and miscible with water, permits replacement of a halogen atom of the polyhalonaphthalene with a hydroxyl group at relatively low reaction temperatures and in an open system. These advantages, together with ease of hydrolysis, are in contrast with known techniques for hydrolyzing halogen-substituted aromatic compounds such as disclosed in U.S. Pat. 3,243,464.

The process of the invention is especially surprising in view of the fact that monochloronaphthalene is not hydrolyzed by the process.

Solvents which meet the criteria of high polar character, high boiling point (relative to the reaction temperature), inertness to the alkali metal hydroxide, and miscibility with water, typically are sulfoxides, sulfones, hexaalkyl phosphoric triamides, N-alkyl-2-pyrrolidones, and aliphatic nitriles. The sulfoxides include lower alkyl sulfoxides such as dimethyl sulfoxide, diethyl sulfoxide; the sulfones include lower alkyl and cycloalkyl sulfones such as dimethyl sulfone, diethyl sulfone, diisopropyl sulfone and tetramethylene sulfone; and the hexaalkyl phosphoric triamides include the lower alkyl phosphoric triamides such as hexamethyl phosphoric triamide and hexaethyl phosphoric triamide. Typical of the pyrrolidones are the N-lower alkyl-2-pyrrolidones such as N-methyl- and N-ethyl-2-pyrrolidone. Lower alkyl nitriles such as propionitrile are representative of the aliphatic nitriles.

The hydrolysis process preferably is conducted by adding a hot solution of the solvent to a concentrated aqueous alkali metal hydroxide and then rapidly adding the polyhalonaphthalene to the mixture while maintaining the reaction mixture at a temperature of at least 100° C. The reaction mixture is agitated until the reaction is complete, normally requiring only a short time at elevated temperatures. Thereafter, the reaction mixture is permitted to cool and is diluted with water. It is believed that the reaction product at this point primarily comprises an alkali metal naphtholate. If desired, the reaction mixture may be clarified, but in any event it is treated with excess dilute mineral acid, preferably hydrochloric acid, to precipitate the product.

Duration of reaction is, of course, inversely proportional to the temperature and is also related to the solvent chosen for the reaction. Preferably the reaction temperature is in the range of from about 120° C. to about 140° C. At least two moles of alkali metal hydroxide are employed per mole of polyhalonaphthalene, preferably a ratio of four to one, same basis. Sufficient solvent should be present to dissolve and to disperse the reactants and to provide a fluid reaction mixture. For this purpose, sufficient solvent to provide a concentration of alkali metal hydroxide plus polyhalonaphthalene in the range of about 4% to 6% by weight is effective. Large excesses of solvent provide no substantial advantage and add unduly to the expense of the process.

Sodium hydroxide, potassium hydroxide and lithium hydroxide are the preferred alkali metal hydroxides.

Representative of the polyhalonaphthalenes are mixtures of tetra- and pentachloronaphthalenes, mixtures of penta and hexachloronaphthalenes, octachloronaphthauene, and octafluoronaphthalene. These and the other polyhalonaphthalenes are known compounds and in most instances are commercially available.

The compounds resulting from the process generally are mixed polyhalonaphthols, including mono- and polyhydroxy naphthols. One specifically identified compound is heptachloro-1-naphthol. The products, heptachloro-1-naphthol in particular, are useful as foliar protectant fungicides. They are also useful as biocides for industrial applications such as slime control of aqueous systems, as in cooling towers and paper mills, preservation of manufactured goods, especially cellulose products, control of microbial growths in oil/water systems, and algae in pools, cooling water systems and industrial water supplies.

In view of the above discussion, many variations in the process will at once be apparent to the skilled chemist without departing from the spirit of the invention. The following examples, likewise, are intended only as further illustrations of the invention and not as limitations except as set forth in the claim.

EXAMPLE 1

Heptachloro-1-naphthol

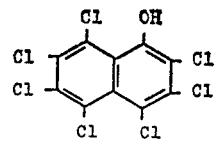

To a solution of 10.0 grams potassium hydroxide in 6 milliliters water is rapidly added 400 milliliters of a hot (120° C.) solution of dimethyl sulfoxide. The resultant solution is stirred at 120° C. and treated rapidly with 16.2 grams octachloronaphthalene. The whole is stirred at 117–122° C. until the reaction is complete, cooled to 40° C., 1,000 milliliters water added and the solution filtered rapidly using a filter aid. The filtrate is stirred rapidly while excess dilute hydrochloric acid is poured in. The precipitated heptachloro - 1 - naphthol is isolated by filtration, washed with water and dried. The product, when recrystallized from hexane, has a melting point of 162–169° C. (decomposition).

If in the above example 10 milliliters water is used instead of 6 milliliters water and the cooling step and filtration eliminated, a similar result is obtained.

EXAMPLE 2

The procedure of Example 1 is followed in all essential respects except that in place of dimethyl sulfoxide, an equal amount of tetramethylene sulfone is used. The product obtained on isolation is 4.5 grams of heptachloro-1-naphthol.

EXAMPLE 3

To a solution of 1.5 grams potassium hydroxide in 1 milliliter water is added 92 milliliters hexamethylphosphoric triamide at 120° C. To this solution is added 4.0 grams octachloronaphthalene. The mixture is heated for 15 minutes at 120–125° C., cooled and diluted with 400 milliliters cold water. On acidification and isolation, the yield is 2.1 grams of a product shown by its solubility in sodium hydroxide solution to be a naphthol.

EXAMPLE 4

To a solution of 2.5 grams potassium hydroxide in 3 milliliters water is added 100 milliliters hot (120° C.) dimethyl sulfoxide. At 120° C. is added 3.2 grams mixed penta- and hexa-chlorinated naphthalene having a chlorine content of 62%. The mixture is stirred at about 120° C. for 15 minutes, cooled to 40° C., diluted with 250 milliliters cold water and filtered with a filter aid. The filtrate containing the product is acidified with dilute hydrochloric acid. The product is isolated, washed with water and dried. Yield is 2.4 grams of alkali-soluble hydrolyzate having a chlorine content of 53.16% and oxygen content of 5.04%.

EXAMPLE 5

The procedure of Example 4 is repeated in all essential respects using 2.5 grams mixed tri- and tetrachlorinated naphthalenes having a chlorine content of 50% and melting point 90–95° C.

Yield is 0.15 gram of chlorinated naphthols having a chlorine content of 40.96% and oxygen 6.89%.

EXAMPLE 6

The procedure of Example 4 is repeated in all essential respects using 1.5 grams potassium hydroxide in 1 milliliter water, 80 milliliters dimethyl sulfoxide and 2.7 grams octafluoronaphtalene; 500 milliliters cold water is used for dilution. Yield is 1.1 grams of fluorinated naphthalene diol, having a fluorine content of 40.3%.

EXAMPLE 7

To a solution of 2.5 grams potassium hydroxide in 2 milliliters water, is added 100 milliliters N-methyl-2-pyrrolidone at 120° C. and 4 grams octachloronaphthalene. The resultant solution is stirred at 120° C. for 15 minutes, cooled to 40° C., diluted with 250 milliliters water and clarified by filtration with a filter aid. The filtrate is acidified with dilute hydrochloric acid. The precipitated product is isolated and dried to give 2.5 grams (66% yield) of alkali-soluble chlorinated naphthol.

EXAMPLE 8

Heptachloro - 1 - naphthol controlled *Chaetomium globosum* and *Fusarium moniliforme* at levels of 25 and 75 parts per million respectively when tested in an agar dilution system. These fungi are implicated as problem fungi in cellulose degradation and product disfigurement (mildew).

The compound also controlled *Aerobacter aerogenes*, *Bacillus mycoides* and *Pseudomonas aeruginosa* at levels of 75, 75 and 22.5 parts per million in standard broth dilution tests. These aerobic bacteria cause slime in paper mills and cooling towers and spoilage of many liquid products such as oil/water emulsions.

It was also shown that the compound controlled the sulfate reducing bacteria, *Desulfovibrio desulfuricans*, and a Clostridia species at levels of 1.25 parts per million an 10 parts per million in bacteriostatic tests as described in the American Petroleum Institute "Recommended Practice No. 38." These anaerobic bacteria are the cause of serious corrosion and plugging of oil filed equipment during secondary oil recovery water flooding and also cause "black spot" during paper manufacture.

Furthermore, in standard procedures the compounds controlled three species of green algae and one specie of blue green algae at levels of from 3.1 to 25 parts per million. These algae are a problem in swimming pools, cooling water systems and industrial water supplies.

EXAMPLE 9

Heptachloro - 1 - naphthol controlled apple scab *Venturia inaequalis* at 300 parts per million. The compound also controlled cucumber anthracnose *Colletotrichum lagenarium* at 500 parts per million. These results demonstrate the utility of the compound as a foliar protectant fungicide.

I claim:
1. Heptachloro-1-naphthol.

References Cited

UNITED STATES PATENTS

| | | | |
|---|---|---|---|
| 3,413,341 | 11/1968 | Bursack et al. | 260—521 |
| 3,481,991 | 12/1969 | Cohen | 260—623 |
| 2,872,461 | 2/1959 | Mattner | 260—623 |
| 3,297,770 | 1/1967 | Cumming | 260—650 |
| 1,062,351 | 5/1913 | Meyers | 260—629 |

OTHER REFERENCES

Bøckman et al., "Tidskr. Kjemi Bergu.," Met. 24 No. 11, pp. 209–15, 1964.

BERNARD HELFIN, Primary Examiner

W. B. LONE, Assistant Examiner

U.S. Cl. X.R.

424—347

UNITED STATES PATENT OFFICE
CERTIFICATE OF CORRECTION

Patent No. 3,651,154  Dated March 21, 1972

Inventor(s) Erwin Klingsberg

It is certified that error appears in the above-identified patent and that said Letters Patent are hereby corrected as shown below:

Column 2, line 23      delete "uene" and substitute --lene--.

Column 4, line 17      delete "an" and substitute --and--.

Column 4, line 20      delete "filed" and substitute --field--.

Signed and sealed this 27th day of February 1973.

(SEAL)
Attest:

EDWARD M. FLETCHER, JR.
Attesting Officer

ROBERT GOTTSCHALK
Commissioner of Patents